(12) United States Patent
Orenstein et al.

(10) Patent No.: US 6,564,821 B1
(45) Date of Patent: May 20, 2003

(54) OVER FILLING INTERDICTION, VENT AND ROLL OVER VALVE

(75) Inventors: Ehud Orenstein, D.N. Halutza (IL); Zohar Moalem, D.N. Halutza (IL); Yoav Livne, D.N. Halutza (IL); Vladimir Olchinski, Beer Sheva (IL)

(73) Assignee: Raval - Agriculture Cooperative Societies Ltd., Halutza (IL)

( * ) Notice: Subject to any disclaimer, the term of this patent is extended or adjusted under 35 U.S.C. 154(b) by 0 days.

(21) Appl. No.: 09/936,620

(22) PCT Filed: Feb. 3, 2000

(86) PCT No.: PCT/IL00/00067
§ 371 (c)(1),
(2), (4) Date: Nov. 19, 2001

(87) PCT Pub. No.: WO00/53960
PCT Pub. Date: Sep. 14, 2000

(30) Foreign Application Priority Data

Mar. 11, 1999 (IL) .................................................. 128937

(51) Int. Cl.[7] .............................................. F16K 24/04
(52) U.S. Cl. ......................................... 137/202; 137/43
(58) Field of Search ..................................... 137/43, 202

(56) References Cited

U.S. PATENT DOCUMENTS

| | | |
|---|---|---|
| 4,163,456 A | 8/1979 | Herron |
| 4,760,858 A | 8/1988 | Szlaga |
| 4,790,349 A | 12/1988 | Harris |
| 4,953,583 A | 9/1990 | Szlaga |
| 4,991,615 A | 2/1991 | Szlaga et al. |
| 5,004,002 A | 4/1991 | Kobayashi |
| 5,139,043 A | 8/1992 | Hyde et al. |
| 5,146,901 A | 9/1992 | Jones |
| 5,234,013 A | 8/1993 | Roetker et al. |
| 5,234,022 A | 8/1993 | Harris |
| 5,497,800 A | 3/1996 | Ohashi et al. |
| 5,518,018 A | 5/1996 | Roetker |
| 5,529,086 A | 6/1996 | Kasugai et al. |
| 5,535,772 A | 7/1996 | Roetker et al. |
| 5,566,705 A | 10/1996 | Harris |
| 5,582,198 A | 12/1996 | Nagino et al. |
| 5,584,278 A | 12/1996 | Satoh et al. |
| 5,640,993 A | 6/1997 | Kasugai et al. |
| 5,666,989 A | 9/1997 | Roetker |
| 5,680,848 A | 10/1997 | Katoh et al. |
| 5,725,012 A | 3/1998 | Ohsaki et al. |
| 5,738,132 A | 4/1998 | Zakai et al. |
| 5,755,252 A | 5/1998 | Bergsma et al. |
| 5,762,090 A | 6/1998 | Halamish et al. |
| 5,769,057 A | 6/1998 | Hashimoto et al. |
| 5,782,258 A | 7/1998 | Herbon et al. |
| 5,782,262 A | 7/1998 | Kim |
| 5,832,950 A | 11/1998 | Shimada et al. |

Primary Examiner—Gerald A. Michalsky
(74) Attorney, Agent, or Firm—Birch, Stewart, Kolasch & Birch, LLP

(57) ABSTRACT

An over filling and roll over valve includes a housing, in which a valve assembly is located. The valve assembly includes a first stage member and a second stage member, being coaxially and relatively displaceable within the housing. The first stage member has a slit-like aperture at a bottom and an outlet aperture at the top. The inlet and the outlet apertures are in flow communication. The second stage member is a float provided with a flexible membrane strip for closing the slit-like aperture of the first stage member. The valve assembly is provided with at least one anchoring member extending between the first stage member and the second stage member and permitting a limited freedom of relative movement therebetween in such a manner that displacement of the second stage member into its second position entails positive displacement of the first stage member into its second position.

15 Claims, 7 Drawing Sheets

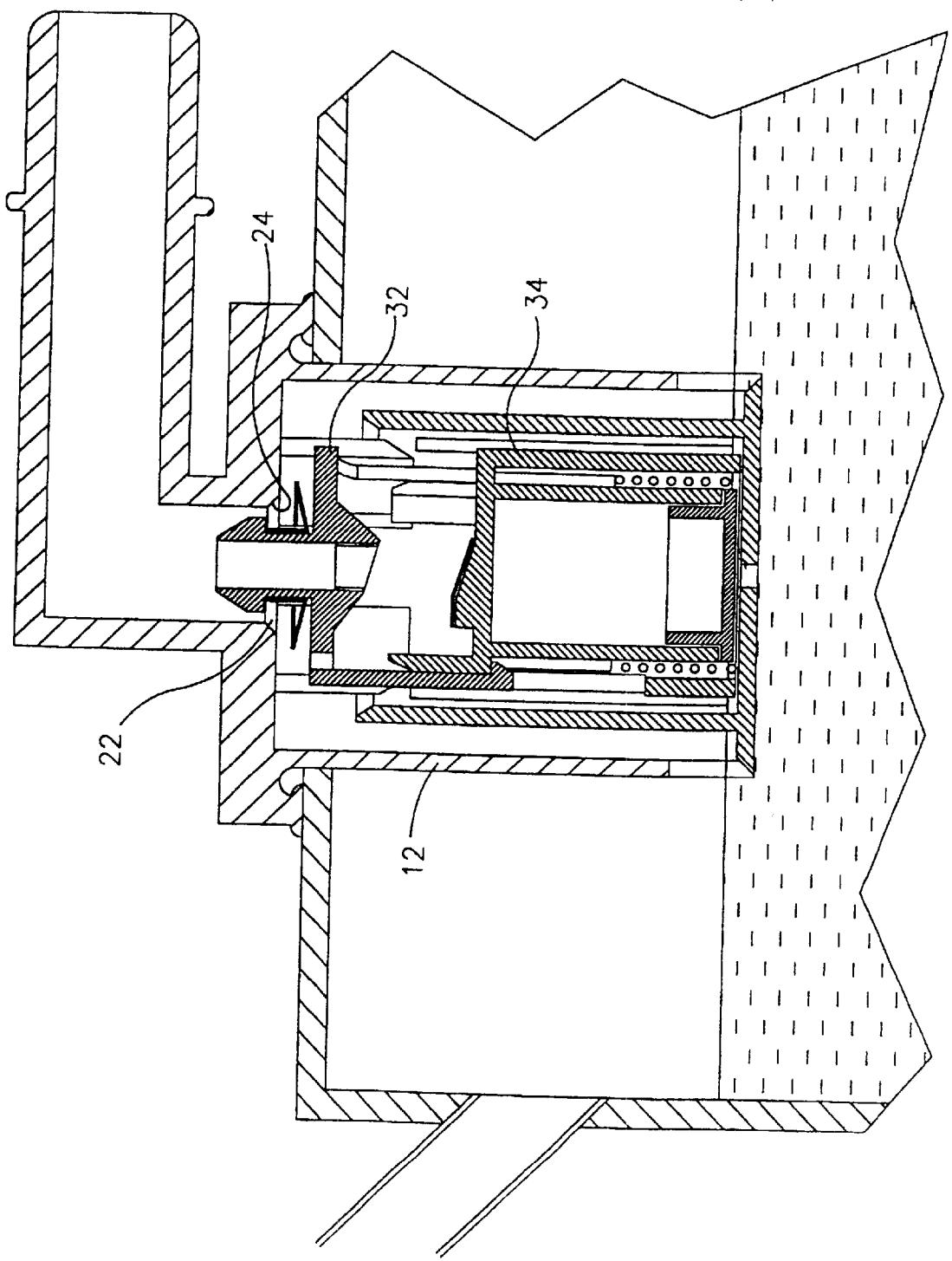

OVER FILLING INTERDICTION, VENT AND ROLL OVER VALVE

This application is the national phase under 35 U.S.C. §371 of PCT International Application No. PCT/IL00/00067 which has an International filing date of Feb. 3, 2000, which designated the United States of America and was published in English.

FIELD OF THE INVENTION

The present invention is generally in the field of valves and in particular, it is concerned with a combined valve for use in vehicle fuel tanks having multi purpose qualities.

BACKGROUND OF THE INVENTION

A large variety of valves for use with vehicles' fuel tanks are known. For example, U.S. Pat. No. 5,738,132 discloses a roll over vent valve (ROV) comprising a housing formed with an inlet and an outlet, said outlet comprising a slit-like aperture, and a float member located within the housing axially displaceable between said inlet and said outlet. An elongated flexible closure member strip is anchored at one end thereof adjacent said outlet and a spring biases the float member in direction of said outlet.

The arrangement is such that the spring biasing force together with buoyancy forces acting on the float member tend to press the membrane strip into sealing engagement with the outlet aperture and gravity forces acting on the float member tend to displace the float member away from the outlet so as to progressively detach the strip from sealing engagement with said outlet.

However, displacement of the float member into the sealing position occurs rapidly wherein said outlet aperture is spontaneously sealed as the closure membrane strip rests against a valve seating of said outlet.

In addition, disengagement of the closure membrane strip from the valve seating might be somewhat delayed, in particular under high pressure. Even more so, this valve is not suitable for discharge of fuel vapor at high flow rates.

U.S. Pat. No. 5,762,090 is an over filling interdiction valve (OFI) comprising a housing furnished with a first fluid inlet at a bottom end thereof and a first fluid outlet at a top end thereof, a float axially displaceable within the housing. The float comprises at its bottom end a second fluid inlet and near its top end a second fluid outlet with sealing means associated at a top end of the float member and biasing means are provided within the housing for biasing the float member towards the first outlet.

The arrangement is such that the biasing means together with buoyancy forces acting on the float member tend to urge the float member to a sealing position in which the sealing means sealingly engage with a first fluid outlet, while gravity force acting on the float member tend to displace the float member away from the first fluid outlet to a unsealed position. The valve is characterized in that it further comprises means for restricting fluid ingress into the float member, wherein raising of the fluid level in the tank results in the rise of fluid level within the housing, as a consequence of which the float member is urged to the sealing position. These restricting fluid ingress means reopen once the vehicle starts moving.

It is an object of the present invention to provide a multi functional valve, for use in vehicle fuel tanks which valve simultaneously serves as an over filling interdiction valve (OFI), a vapor recovery valve, a roll over valve (ROV), a filling limit vent valve (FLVV), an onboard refueling vapor recovery valve (ORVR) and as vent valve. It is a further object of the present invention to provide a valve of improved design wherein displacement into its sealing position does not generate a pressure shockwave within the fuel tank on the one hand, and, on the other hand, provides opening of the valve, even under essentially high pressure.

SUMMARY OF THE INVENTION

In accordance with the present invention there is provided a valve for use, in particular, with vehicles' fuel tanks the valve comprising: a housing defining a confined space formed with one or more fluid inlets to said confined space, a fluid outlet port at a top end of said confined space, and a valve seating bounding said outlet port;

a valve assembly located within the confined space and comprising a first stage member and a second stage member, both being substantially coaxially displaceable within the housing;

said first stage member having at a bottom end thereof a substantially elongated slit-like inlet aperture, and at a top end thereof an outlet aperture being in flow communication with said inlet aperture, where said first stage member is axially displaceable between a first position in which the outlet aperture progressively sealingly engages the outlet port of the housing, and a second position in which it is disengaged therefrom;

said second stage member being a float fitted with a flexible closure membrane strip anchored at one end thereof to a top wall of said float member, said closure membrane facing said inlet aperture of the first stage member, the second stage member being displaceable between a first position in which the closure membrane sealingly engages said inlet aperture, and a second position in which it is progressively disengaged therefrom;

at least one anchoring member extending between the first stage member and the second stage member, wherein displacement of the second stage member into its second position entails positive displacement of the first stage member into its second position.

Typically, the outlet port of the valve is connected by suitable piping, to a vapor treating device, e.g. a canister.

The arrangement in accordance with the present invention is such that at an upright position of the valve, buoyancy forces acting on the second stage member tend to displace the second stage member and the first stage member into their respective first positions where the valve is sealingly closed, whilst gravity forces acting on the second stage member tend to displace it into its second position, entailing delayed displacement of the first stage member into its second position; and in a downright position of the valve, the first stage member and the second stage member are instantaneously displaced into their respective first positions so as to seal the valve.

In accordance with a specific embodiment there is further provided a biasing member located within the confined space for biasing the second stage member into its first position acting together with the buoyancy forces so as to displace both the first stage member and the second stage member into their respective first positions.

Typically, where the valve is to be attached to a vehicle's fuel tank, the housing is formed with a flanged portion for attachment around an opening formed in the tank, with the housing projecting into the tank.

In accordance with the invention, the uppermost inlet of the one or more fluid inlets in the housing, determines the maximum fuel level within the tank, namely when liquid in the tank reaches this level thus, the valve gradually closes entailing fuel filling cut-off.

By a preferred design of the valve in accordance with the invention, the fluid outlet of the housing has a circular cross-section, and the outlet aperture of the first stage member is a tubular projection receivable within said fluid outlet and wherein the first stage member is gradually displaceable into the first position, whereby fluid flow through the fluid outlet diminishes until complete cutoff. Preferably, one or both of the outlet of the housing and the outlet aperture of the first stage member taper upwardly. This arrangement provides gradually diminishing of the effective cross-sectional area of the outlets of the housing whereby a gentle shut-off of the valve occurs.

In order to provide improved sealing in the closed position, a sealing member is provided on either or both of the outlet of the housing and the outlet aperture of the first stage member, whereby sealing engagement occurs only when the first stage member is fully displaced into its first position.

The arrangement in accordance with the invention is such that the length of the one or more anchoring member ensures that when the second stage member is in rest over a bottom base of the housing, the first stage member is in its second position. In accordance with one embodiment, the anchoring member is one or more leg portions extending from one of the first stage member and the second stage member and formed with a hooking portion; said leg portions being slidingly engaged with the other of said first stage member and the second stage member.

For providing improved opening of the valve, also at essentially large pressures, the inlet aperture of the first stage member is inclined with respect to a longitudinal axis of the housing. Correspondingly, a top surface of the second stage member bearing the closure membrane is substantially equally inclined with respect to said longitudinal axis, whereby said closure membrane, when in sealing engagement with said inlet aperture, is pressed along its length against the inlet aperture by said inclined surface of the second stage member.

In accordance with a preferred embodiment of the invention, the first stage member and the second stage member are rotatably restrained with respect to one another. Still preferably, they are rotatably restrained with respect to the housing.

BRIEF DESCRIPTION OF THE DRAWINGS

For better understanding the invention and to show how it may be carried out in practice, a preferred embodiment will now be described, by way of a non-limiting example only, with reference to the accompanying drawings, in which:

FIG. 7 illustrates the valve of FIG. 1 in the position where the second stage member positively displaces the first stage member into its second position

DETAILED DESCRIPTION OF A PREFERRED EMBODIMENT

Figure 1:
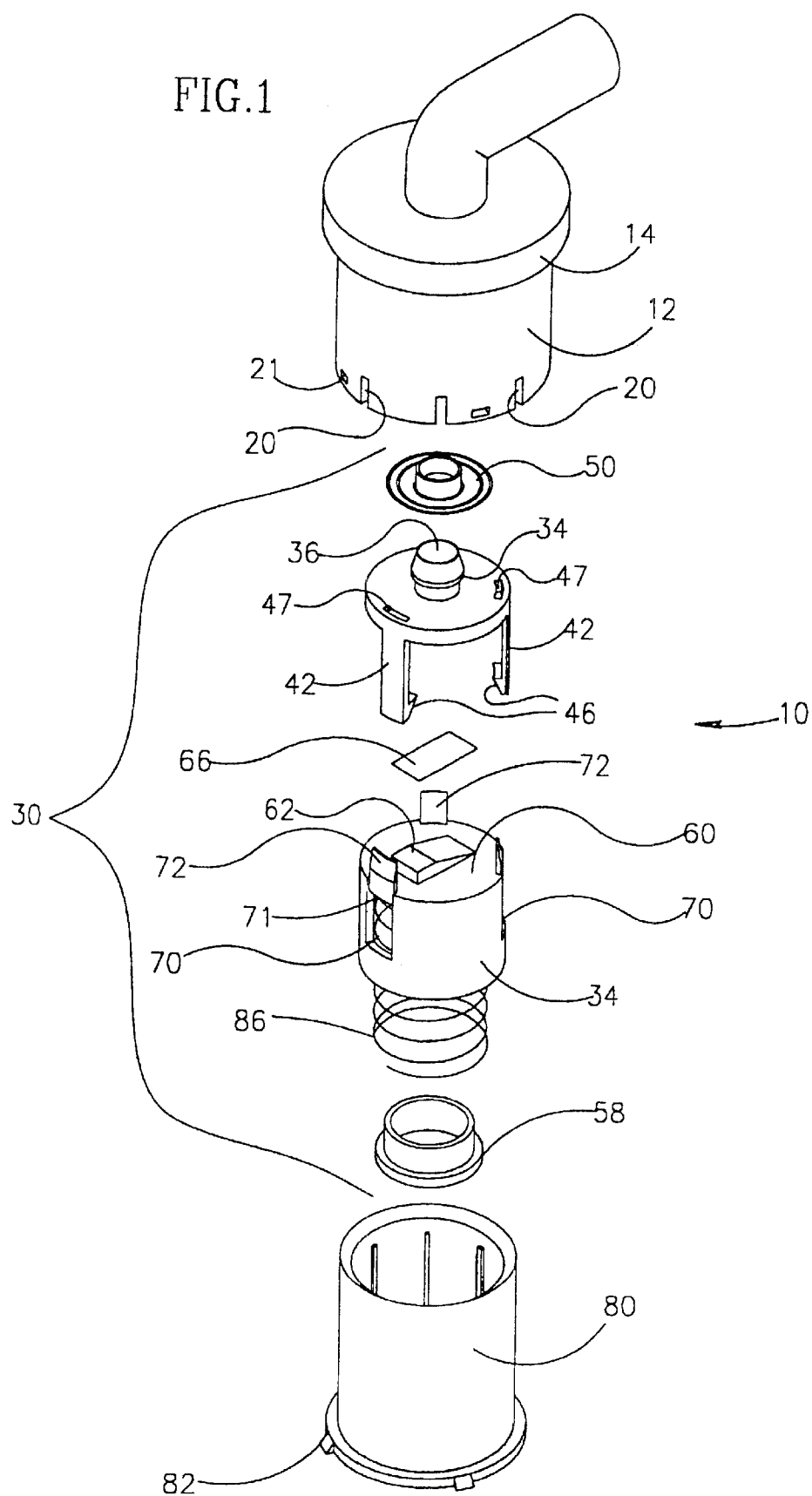
FIG. 1 is a perspective, exploded view of the valve in accordance with the present invention.
Figure 2:
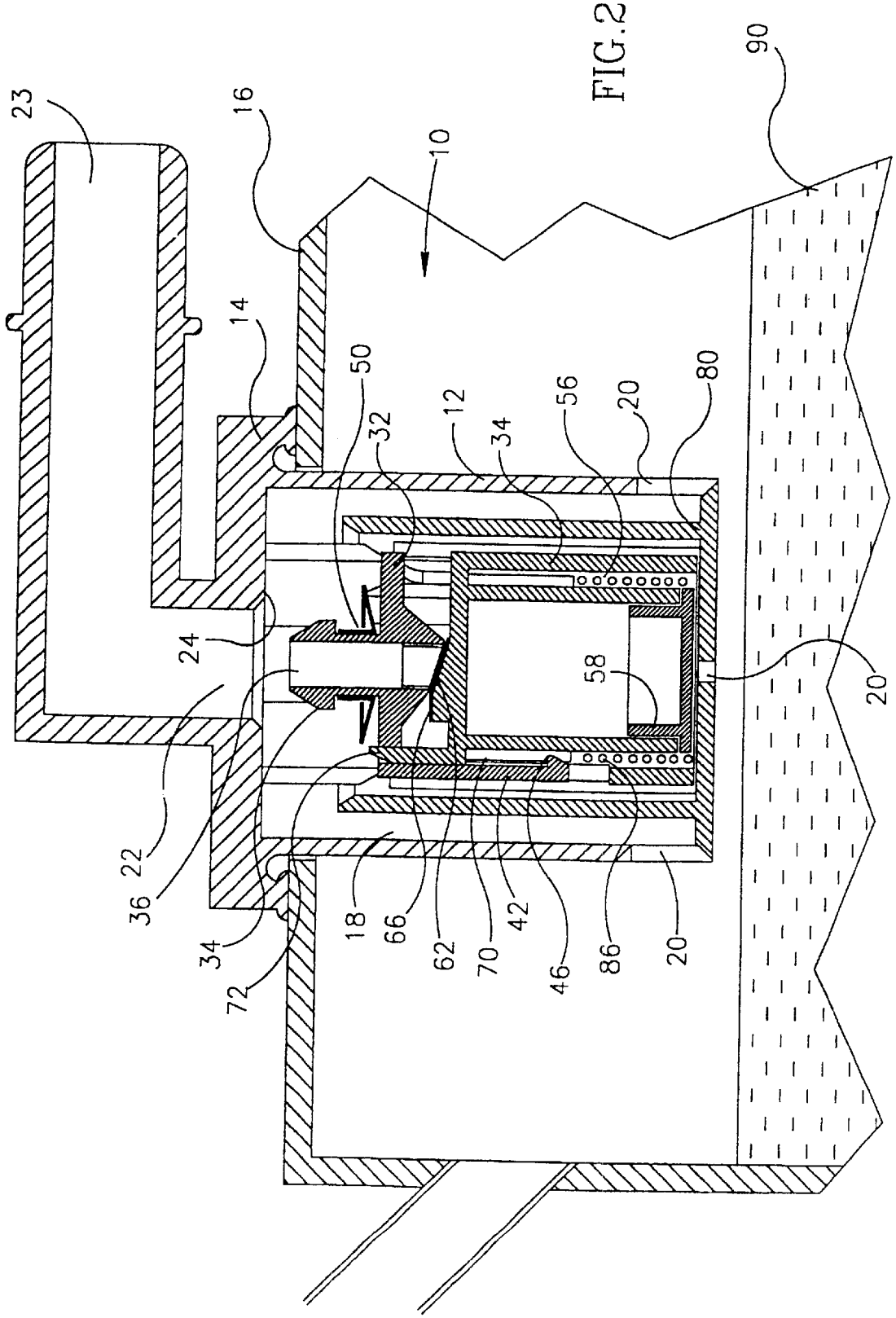
FIG. 2 is a sectioned view of the valve in accordance with the present invention, assembled within a fuel tank and illustrated in its rest, fully opened position.

Attention is first directed to FIGS. 1 and 2 for understanding the construction of the valve generally designated 10. The valve comprises a cylindric housing portion 12 formed with a flange 14 at an upper portion thereof for attachment by heat welding, to an external surface of a fuel tank 16, where the cylindric portion 12 extends into the fuel tank. Duct portion 23 is provided in flow communication with the outlet port 22.

As can be seen, best in FIG. 2, the housing defines a confined space 18 having a plurality of fluid inlets 20 and, at a top end of the confined space, an outlet port 22 bound by a valve seating 24. Housing 12 comprises also recesses 21 at a lower end thereof.

A valve assembly 30 comprises a first stage member 32 and a second stage member 34. The first stage member 32 has a top end thereof a tapering projection 35 formed with an outlet aperture 36. First stage member 32 is formed at a bottom end thereof with an elongate slit-like inlet aperture 40 having an inclined bottom surface (seen only in FIGS. 2–7). Three anchoring leg members 42 extend radially downwardly, each formed at a lowermost end thereof with an engagement projection 46, and three slots 47 are formed in register with the leg member 42 as will be explained hereinafter.

Mounted on the projection 35 there is a resilient sealing member 50, the cross-section of which is seen in FIGS. 2–7, and which is adapted for sealing engagement with the valve sealing 24 of housing 12.

The second stage member 34 is a double-walled float member defining an annular spring receptacle 56, which float member is sealed at a bottom end thereof by a plug 58.

On a top wall 60 of float member 34 there is formed an inclined support surface 62 which is inclined substantially equally as the bottom surface of inlet port 40 of the first stage member 32. A flexible closure membrane strip 66 is anchored, at one end thereof, to the portion 62, the purpose of which will become apparent hereinafter.

The second stage member 34 is formed with three axial cut-outs 70 formed with shoulders 71 and three corresponding projections 72, matching with projections 42 and slots 47, respectively, of the first stage member 32.

The arrangement is such that in the assembled position, the projections 46 of anchoring leg portions 42 of the first stage member 32 are slidingly received within recesses 70 of the second stage member 34 and similarly, projections 72 of the second stage member are slidingly received within slots 47 of the first stage member 32 in this manner, the two stage members may be axially displaced with respect to one another, up to a limited extent, the limited extend being defined by the length of the leg portions 42. It is also ensured that the first stage member 32 and the second stage member 34 are rotatably restrained with respect to one another, so as to ensure correct positioning of the surface 62 and the closure membrane 66 associated thereto with respect to the inlet 40 of the first stage member 32.

The valve assembly 30 is packed within housing 12 by a closure member 80 with projections 82 adapted for snap engagement with recesses 21 of housing 12. In the assembled position, there is provided a coiled spring 86 received within annular cavity 56 of float member 34. The arrangement is such that the closure member 80 has an open top allowing free flow communication between the float assembly 30 and the confined space 18 of the housing.

Further attention is now directed to FIGS. 2 to 7 for understanding how the valve operates under different conditions.

In FIG. 2, the fuel level 90 within tank 60 does not reach the bottom end of the valve assembly 10 and the valve is thus in its fully opened position wherein the first stage member 32 and the second stage member 34 are in their downward position (referred to as second position), under influence of force of gravity, wherein the coiled spring 86 is depressed. In this position fuel vapor is free to flow via inlet apertures 20 through confined space 18 and out through outlet port 22, and then via duct to a vapor treating device, typically a cannister.

It is noted that the fluid inlets 20 and the outlet port 22 are of significantly large cross-sections so as to allow evacuation of fuel vapor also at high flow rates. This is an important character which plays a role during fuel filling.

Figure 3:
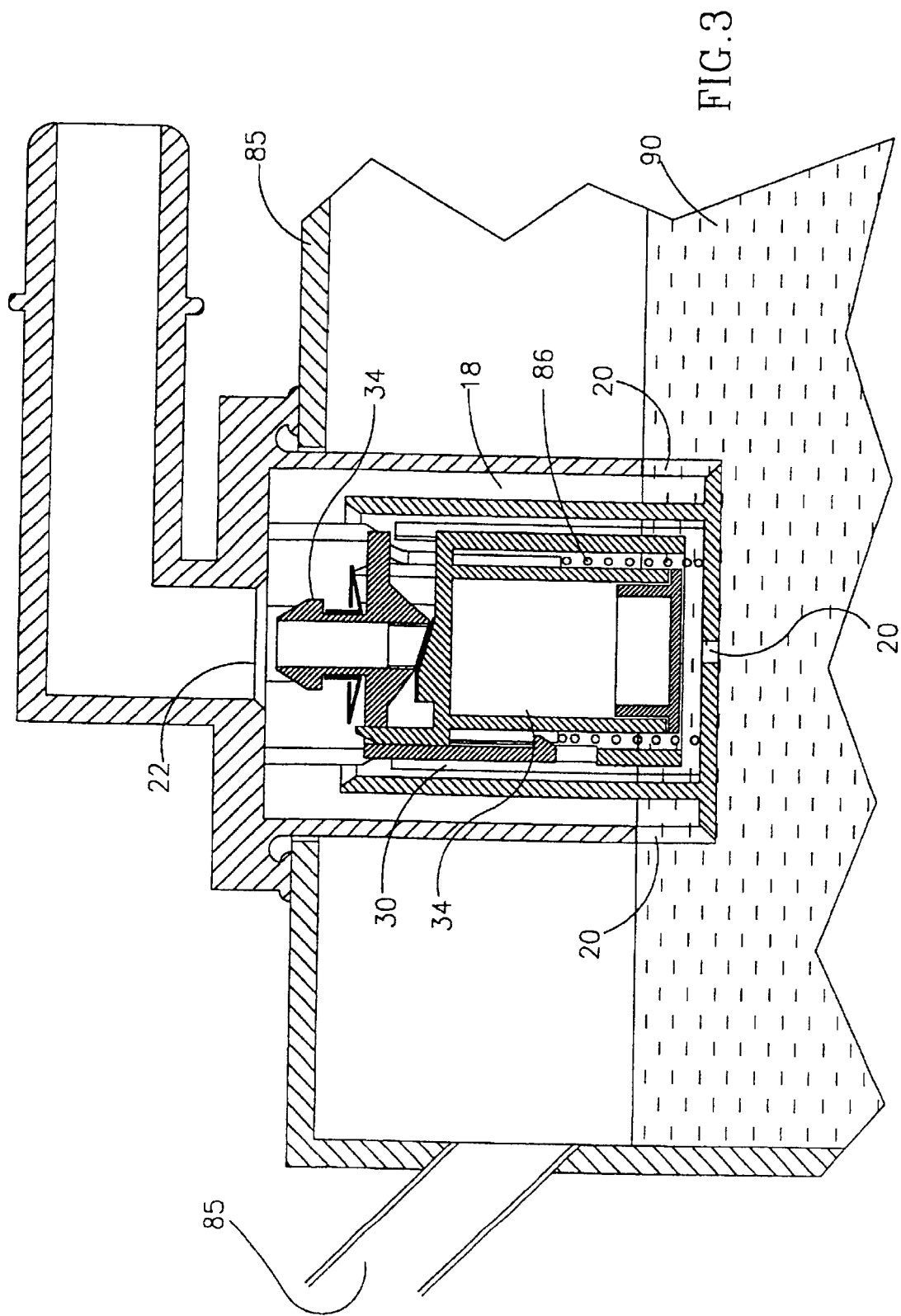
FIG. 3 illustrates the position of the valve seen in FIG. 2 when fuel level within the tank reaches a maximum filling level, wherein the valve is gradually displaced into its sealing position.
Figure 4:
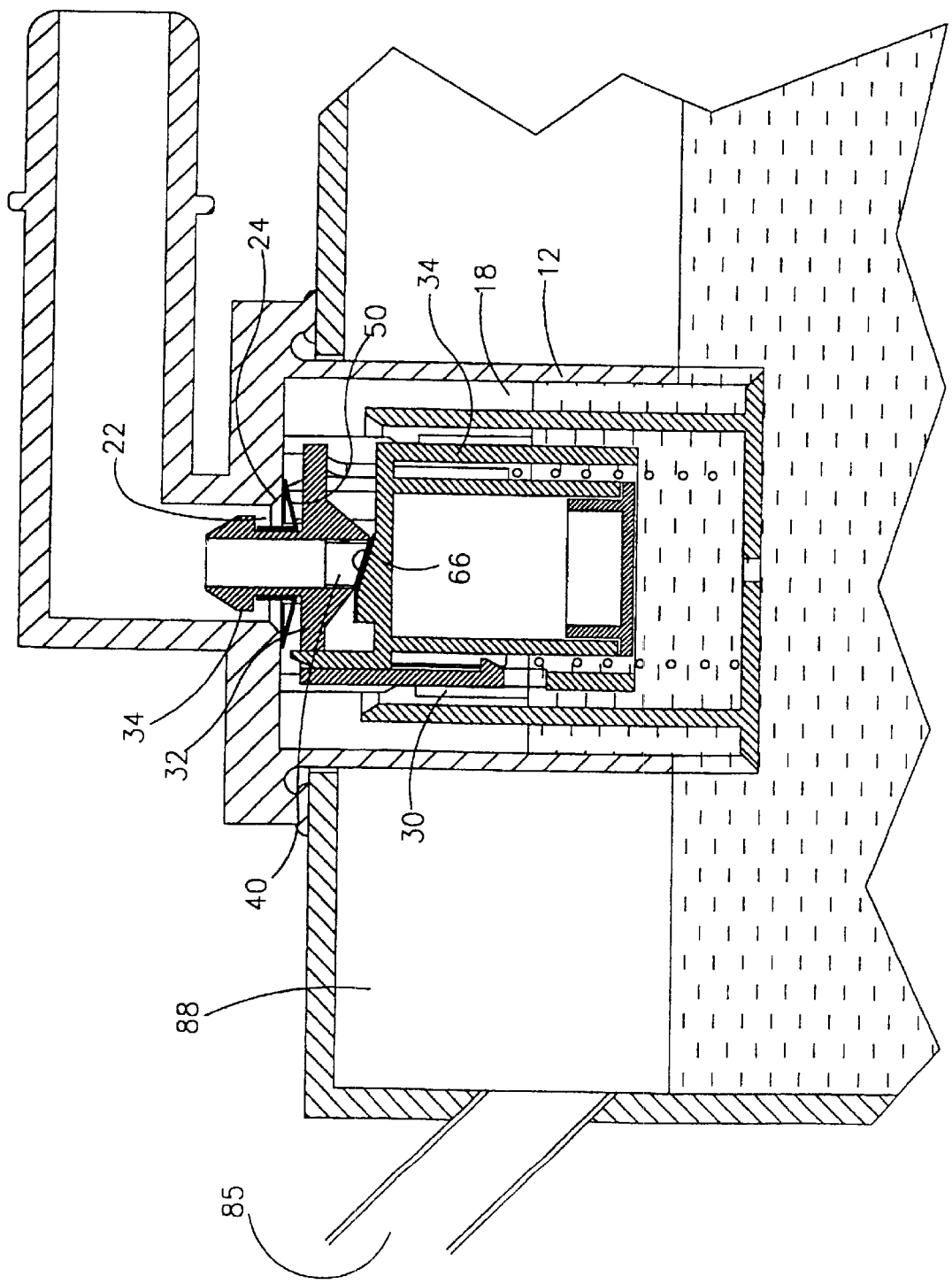
FIG. 4 illustrates the valve of FIG. 1 in its sealed position.

With reference to FIG. 3, as fuel level 90 increases within tank 16, as a result of fuel filling through fuel port 85, the fuel enters the confined space 18 of the valve via the fluid inlets 20 wherein the spring biasing force applied by spring 16, together with the buoyancy forces acting on the float member 34 tend to raise the float assembly 30 consequently as the level of fuel 90 raises within tank 16. It is noted in FIG. 3, that the first stage member 32 is somewhat displaced along with the second stage member 34 wherein the fluid outlet port 22 is still open though its cross-sectional area diminishes to about 50% of its area In a consequent step, seen in FIG. 4 of the drawings, the fuel level within the confined space 18 raises to a stage wherein the valve assembly 30 is biased into an uppermost position wherein projection 35 of the first stage member 32 is fully received within the outlet aperture 22 of housing 12 and the sealing member 50 sealingly engages the valve seating 24. The closure membrane strip 66 sealingly engages the inlet aperture 40 of the first stage member 32 wherein the valve is in its so-called closed position, prohibiting liquid or vapor cgress via outlet port 22.

It will be noted that the first closing stage of FIG. 3 prevents generation of a shock wave when the valve members are displaced into the closed position.

In this position, fuel filling via fuel port 85 is cut-off as there is a pressure build-up within the volume of the tank 16, entailing cut-off of the filling assembly (not illustrated).

Figure 5:
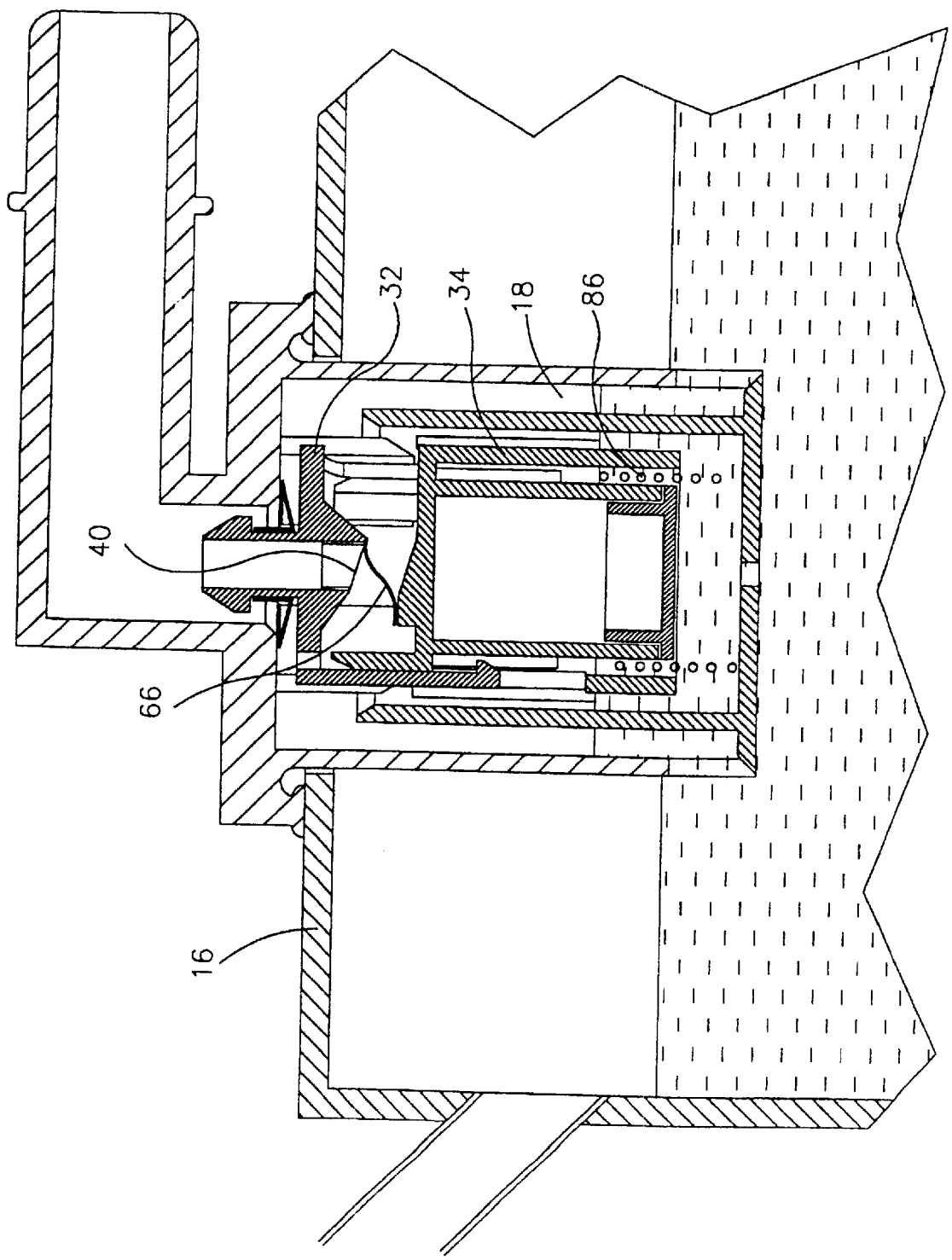
FIG. 5 illustrates the valve in a first opening step, wherein the second stage member gradually displaces into its second open position.

The position illustrated in FIG. 5 of the drawings represents the situation after fuel filling, wherein liquid level within the confined space 18 slightly drops, allowing displacement of the second stage member 34 downward to its second position, wherein it progressively descends and wherein the closure membrane strip 66 progressively detaches from the slit-like inlet aperture 40 of the first stage member 32. The weight of the float member, together with the absence of upwardly directed buoyancy forces, overcomes the upwardly-directed biasing effect of the coiled compression sprint 86, and the float member 34 displaces into its second position with progressive opening of the inlet 40. It will be appreciated that opening of the inlet 40 occurs even if the tank is still under essentially high pressure owing to the progressive detachment of the closure membrane strip 66 from the elongated slit-like inlet aperture 40.

Figure 6:
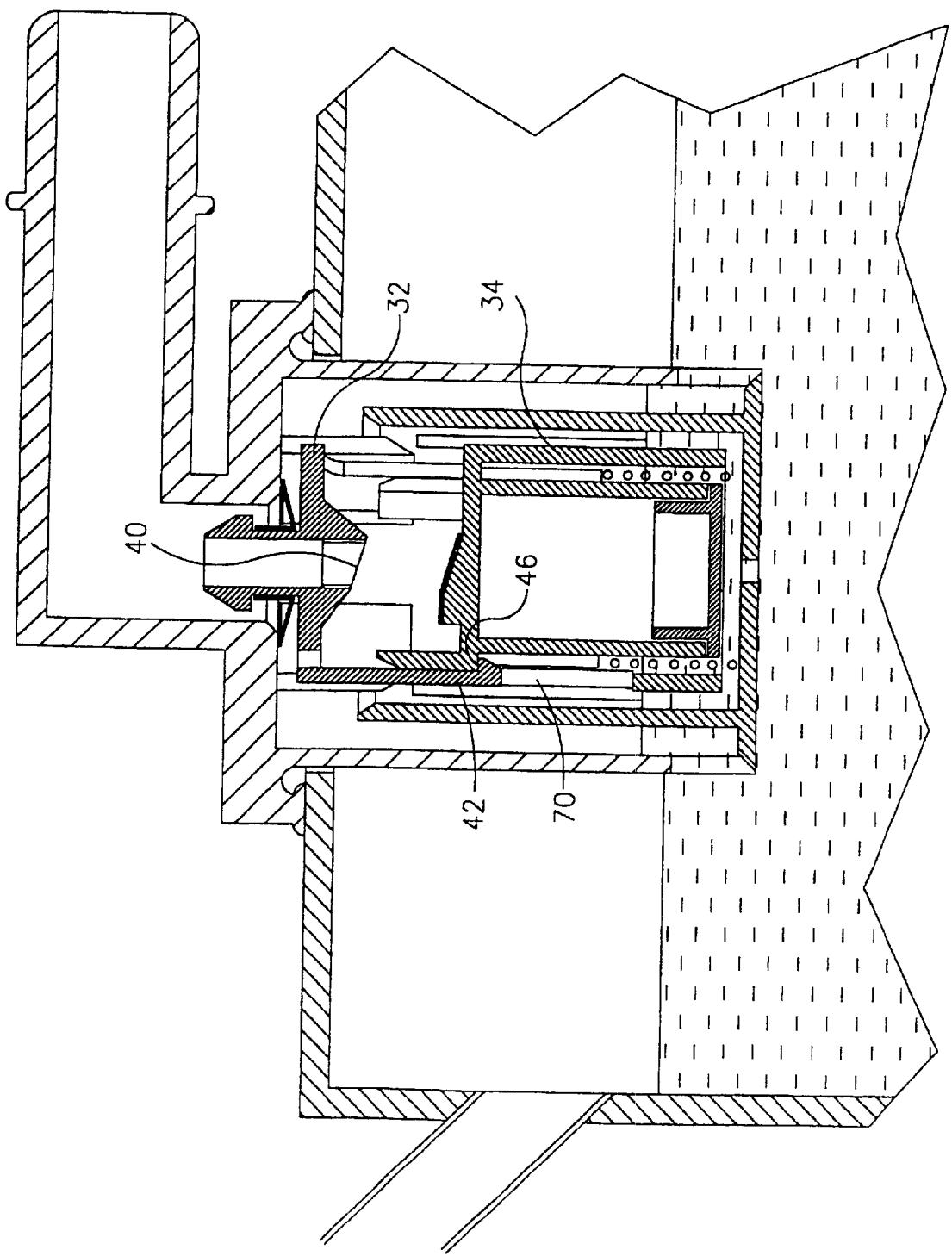
FIG. 6 illustrates the valve of FIG. 1 in a position in which the first stage member is still in its second position whilst the second stage member is in its first position.

Once the second stage member 34 begins descending, and after the closure membrane strip 66 disengages from the inlet port 40 of the first stage member 32, the pressure within the tank 16 drops while the second stage member 34 displaces downwardly, as seen in FIG. 6, wherein projections 46 of leg members 42 of the first stage member 32 engage with shoulder 71 of opening 70 of the second stage member 34, entailing positive downward displacement of the first stage member 32 as seen in FIG. 7.

It is appreciated that once the pressure within the fuel tank 16 drops, and as the first stage member 32 is positively detached from the outlet 22 of the housing 12 with consecutive disengagement of sealing member 50 from the valve seating 24, then the first stage member will continue to displace into the initial position seen in FIG. 2 wherein it rests over the second stage member 34.

The valve disclosed herein above automatically shuts in case of roll over, as the valve assembly 30 displays into sealing engagement with the outlet port 22, that owing to the gravitation force when the vehicle is upside down.

While a preferred embodiment of a valve in accordance with the present embodiment has been shown and described in the specification, it will be understood by an artisan that it is not intended thereby to limit the disclosure of the invention, but rather it is intended to cover all modifications and arrangements falling within the scope and spirit of the present invention, mutatis mutandis.

What is claimed is:

1. An over filling interdiction, vapor venting and roll over multi-function valve 10 comprising:

a housing 12 defining a confined space 18 formed with at least one inlet 20 to said confined space 18, a fluid outlet port 22 at a top end of said confined space 18, and a valve seating 24 bounding said outlet port 22;

a valve assembly 30 located within the confined space 18 and comprising a first stage member 32 and a second stage member 34, both being substantially coaxially displaceable within the housing 12;

said first stage member 32 having at a bottom end thereof a substantially elongated slit-like inlet aperture 40, and at a top end thereof an outlet aperture 36 being in flow communication with said inlet aperture 40, where said first stage member 32 is axially displaceable between a first position in which the outlet aperture 36 progressively sealingly engages the outlet port 22 of the housing 12, and a second position in which it is disengaged therefrom;

said second stage member 34 being a float fitted with a flexible closure membrane strip 66 anchored at one end thereof to a top wall 62 of said float member, said closure membrane strip 66 facing said inlet aperture 40 of the first stage member 30, the second stage member 34 being displaceable between a first position in which the closure membrane strip 66 sealingly engages said inlet aperture 40, and a second position in which it is progressively disengaged therefrom; and at least one anchoring member extending between the first stage member 32 and the second stage member 34, said anchoring member permitting a limited freedom of relative movement therebetween, wherein displacement of the second stage member 34 into its second position entails positive displacement of the first stage member 32 into its second position.

2. A valve according to claim 1, wherein a biasing member 86 is located within the confined space 18 for biasing the second stage member 34 into its first position.

3. A valve according to claim 1, wherein the housing 12 is formed with a flanged portion 14 for attachment to a fuel tank of a vehicle.

4. A valve according to claim 3, wherein an uppermost aperture of the fluid inlet 20 determines the maximum fuel level within the tank 10.

5. A valve according to claim 1, wherein the fluid outlet 22 of the housing 18 has a circular cross-section, and the outlet aperture 36 of the first stage member 32 is a tubular projection 35 receivable within said fluid outlet 22.

6. A valve according to claim 5, wherein the fist member 32 is gradually displaceable into the first position, whereby fluid flow through the fluid outlet 22 diminishes until complete cutoff.

7. A valve according to claim 5, wherein a sealing member 50 is provided on either the outlet 22 of the housing 12 or the outlet aperture 36 of the first stage member 32, whereby sealing engagement occurs only when the first stage member 32 is fully displaced into its first position.

8. A valve according to claim 5, wherein the outlet 22 of the housing 12 and the outlet aperture 36 of the first stage member 32 taper outwardly.

9. A valve according to claim 5, wherein a sealing member 50 is provided on the outlet 22 of the housing 12 and the outlet aperture 36 of the first stage member, whereby sealing engagement occurs only when the first stage member 32 is fully displaced into its first position.

10. A valve according to claim 5, wherein the outlet 22 of the housing 12 or the outlet aperture 36 of the first stage member 32 taper outwardly.

11. A valve according to claim 1, wherein the length of at least one anchoring member 42 ensures that when the second stage member 34 is in rest over a bottom base of the housing 12, the first stage member 32 is in its second position.

12. A valve according to claim 1, wherein the anchoring member 42 is at least one leg portion extending from the first stage member 32 and at least one projection 72, extending from the second stage member 34, said leg portion is formed with a hooking portion 46; said leg portion 42 of said first stage member 32 being slidingly engaged with the projection 72 of the second stage member 34.

13. A valve according to claim 1, wherein the inlet aperture 40 of the first stage member 32 is inclined with respect to a longitudinal axis of the housing 12.

14. A valve according to claim 13, wherein a top surface 62 of the second stage member 34 bearing the closure membrane strip 66 is substantially equally inclined with respect to said longitudinal axis, whereby said closure membrane strip 66, when in sealing engagement with said inlet aperture 40, is pressed along its length against the inlet aperture 40 by said inclined surface 62 of the second stage member 34.

15. A valve according to claim 13 wherein the first stage member 32 and the second stage member 34 are rotatably restrained with respect to one another.

* * * * *